US008194573B1

(12) United States Patent
Smith et al.

(10) Patent No.: US 8,194,573 B1
(45) Date of Patent: Jun. 5, 2012

(54) DIRECTIONAL ACCESS NETWORK CONTROL SYSTEM AND METHOD

(75) Inventors: Patrick J. Smith, Salt Lake City, UT (US); Michael J. Hurst, South Jordan, UT (US); Daniel G. Watt, West Jordan, UT (US); Dennis C. Pulsipher, Farmington, UT (US)

(73) Assignee: L-3 Communications, Corp., New York, NY (US)

( * ) Notice: Subject to any disclaimer, the term of this patent is extended or adjusted under 35 U.S.C. 154(b) by 177 days.

(21) Appl. No.: 12/172,739

(22) Filed: Jul. 14, 2008

(51) Int. Cl.
*H04L 12/28* (2006.01)
(52) U.S. Cl. ...................................................... 370/255
(58) Field of Classification Search ................... None
See application file for complete search history.

(56) References Cited

U.S. PATENT DOCUMENTS

| 5,946,603 | A | * | 8/1999 | Ibanez-Meier et al. | 455/13.1 |
| 5,987,011 | A | * | 11/1999 | Toh | 370/331 |
| 6,377,805 | B1 | * | 4/2002 | Anvekar et al. | 455/436 |
| 6,816,115 | B1 | * | 11/2004 | Redi et al. | 342/367 |
| 6,975,613 | B1 | * | 12/2005 | Johansson | 370/338 |
| 2003/0100289 | A1 | | 5/2003 | Call et al. | |
| 2004/0121786 | A1 | | 6/2004 | Radcliffe et al. | |
| 2004/0157611 | A1 | * | 8/2004 | Smith et al. | 455/445 |
| 2004/0218548 | A1 | | 11/2004 | Kennedy et al. | |
| 2004/0218582 | A1 | * | 11/2004 | Kennedy et al. | 370/351 |
| 2007/0091871 | A1 | * | 4/2007 | Taha | 370/352 |
| 2008/0056223 | A1 | * | 3/2008 | Manser | 370/342 |

FOREIGN PATENT DOCUMENTS

| EP | 0993149 | 4/2000 |
| GB | 2343594 | 5/2000 |

* cited by examiner

*Primary Examiner* — Yong Zhou
(74) *Attorney, Agent, or Firm* — Kirton McConkie; N. Kenneth Burraston

(57) ABSTRACT

A directional access network can include a plurality of nodes and wireless links between ones of the nodes. Topology management of the network can discover when network fragmentation exists, identify nodes positioned to heal the fragmentation, and establish new active links between the identified nodes.

27 Claims, 7 Drawing Sheets

DIRECTIONAL ACCESS NETWORK CONTROL SYSTEM AND METHOD

FIELD OF THE INVENTION

The present invention relates generally to wireless networks. More particularly, the present invention relates to network control within a wireless network.

BACKGROUND

Communication advancements in modern times have historically been driven by research and development for military purposes. The technology used in cell phones and cellular networks was first developed during World War II to enable the military to communicate on the battlefield. The Internet was developed during the cold war to allow the military to interconnect its computers and exchange information throughout the world. The ability to communicate and share information has been as important to the military's ability to fight as modern weapon development. Increasingly, military communications have come to rely on wireless technologies to accommodate the highly mobile nature of the battlefield environment.

With the end of the cold war, the military has evolved to become lighter and faster moving, with ever-increasing demands imposed on its communications equipment. The military wants more and more information available to commanders, and even to the individual soldier in the field. Modern conflicts and disasters require the military to quickly respond to remote corners of the world with little advance warning. However, much of the past wireless communications infrastructure developed for the military is reliant on a fixed infrastructure, and it may be difficult, if not impossible, to set up an adequate number of cell towers and radio antennas on a rapidly advancing battlefield. Moreover, careful advance mission planning has been required in order to achieve the necessary communications capabilities that rely on non-fixed equipment. With the explosion in broadband communications needs, the problem of managing the physical layer of operating bands, data rates, transmitter power levels, etc., so as to maintain viable communications networks, has increasingly demanded the development of autonomous management technologies.

To that end, research is being done to develop an autonomous, mobile, wireless communications infrastructure which can enable a highly mobile force to communicate while on the move, with a minimum of mission planning. Rather than relying on detailed pre-mission planning, dedicated antennas and cellular stations, the mobile infrastructure can use smaller, portable, autonomously managed nodes. Nodes can be used as repeaters for other nodes, at the discretion of the autonomous manager. New nodes can be added as the mobile force advances, and the network adjusted to compensate for planned or unplanned losses of network nodes. Various ground and air vehicles can become nodes that contribute to the network communications infrastructure. The large number of nodes in a moving force can increase the robustness of the communications infrastructure in an environment fraught with hazards. As nodes move in and out of range or are destroyed in fighting, other available nodes can be used to repair or replace lost communications links. The development of intelligent, autonomous managers for maintaining functional communications networks in the face of these unpredictable events is thus desirable.

Light weight, robust, portable networks can enable a nimble fighting force to effectively communicate with each other and with commanders located outside the battlefield. Large amounts of information can be transmitted and shared, including real time, high definition video. The increase in information can serve as a force magnifier, enabling even faster and lighter forces to be assembled in any corner of the world. However, managing and organizing this communications network in the face of fast-paced and unpredictable evolution of the battlefield environment can quickly overwhelm human technicians.

Controlling a mobile network made up of a number of moving nodes can be a substantial challenge. In providing communications paths through a changing multi-node network, a large number of variables can make the task challenging. Computers may be used to sort through thousands of possible variables in path length, power, frequency, location, number of hops between nodes, physical blockades, and other factors in order to complete a single link. Managing and balancing the needs of dozens or hundreds of possibly interfering and competing links on a large battlefield can seem overwhelming, even using today's modern computing capabilities.

SUMMARY

Accordingly, it has been recognized that it would be advantageous to develop computationally efficient techniques for managing the physical connectivity in a directional wireless network.

In some embodiments a wireless directional network can include a number of nodes, where some of the nodes are mobile and can move in three dimensions. In some embodiments, directional communications links can be formed between some of the nodes. In some embodiments, one or more topology managers can be disposed on the nodes, and the topology manager(s) can manage the topology of the network.

In some embodiments, the topology manager can include means for receiving information describing a position of each of the plurality of nodes and means for determining when network fragmentation exists. Network fragmentation can exist when no directional links are present between any one of a first set of nodes and any one of a second set of nodes. In some embodiments the topology manager can include means for identifying one or more nodes in the first set of nodes having line of sight connectivity to one or more nodes in the second set of nodes, and means for establishing an active link using the identified nodes.

In some embodiments, a method for managing physical connectivity in a wireless directional network can include linking two or more of a plurality of nodes together to form active links using the radio communications equipment of the nodes. In some embodiments, the method can include discovering when network fragmentation exists wherein no active links are present between any one of a first set of nodes and any one of a second set of nodes. In some embodiments the method can include determining positions of each of the nodes and identifying one or more nodes in the first set of nodes having line of sight connectivity to one or more nodes in the second set of nodes based on the positions. In some embodiments, the method can include establishing an active link using the identified nodes.

DETAILED DESCRIPTION OF EXAMPLE EMBODIMENT(S)

Figure 1:
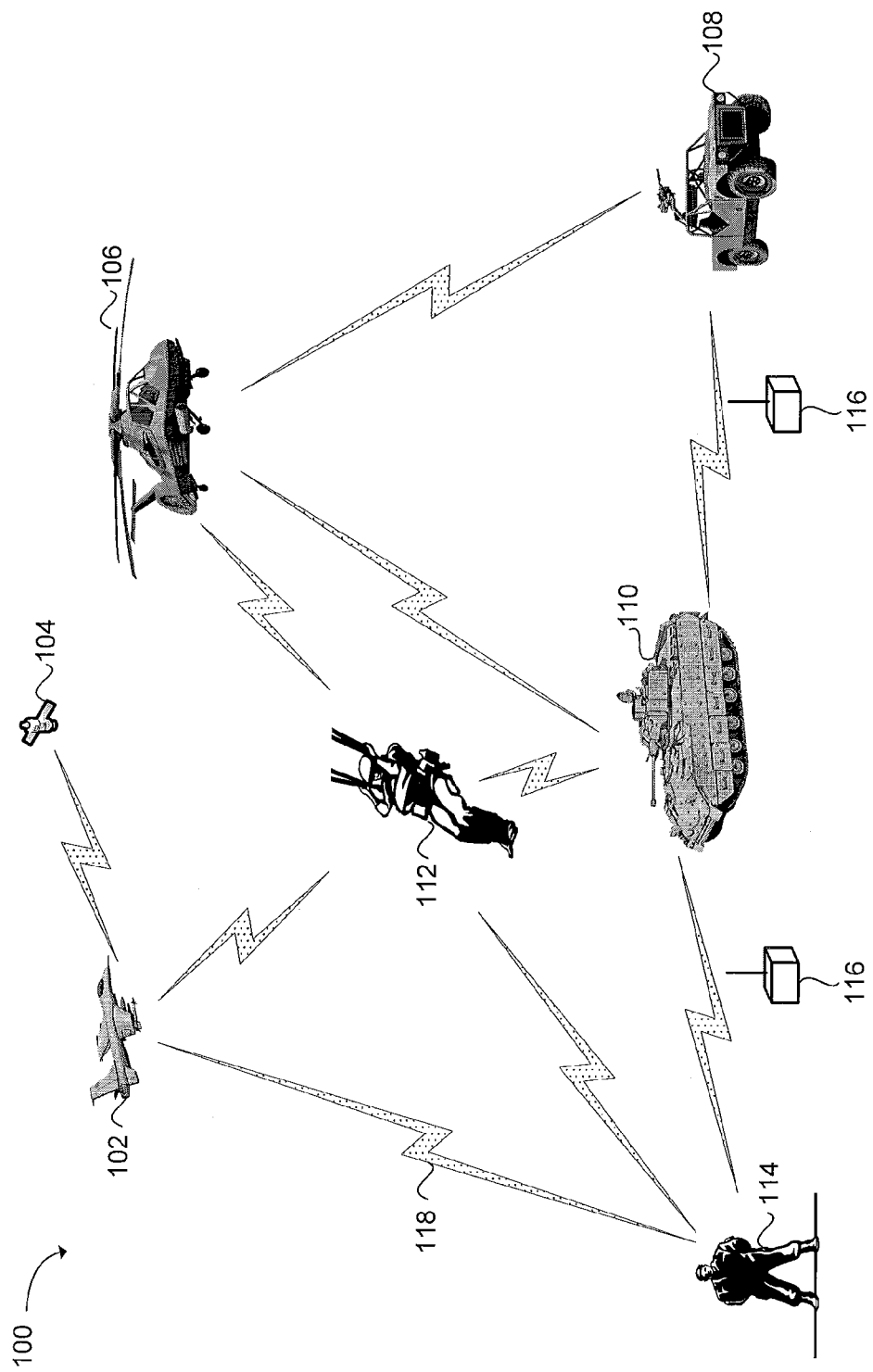
FIG. 1 is a block diagram of a wireless directional network in accordance with some embodiments of the invention.

Reference will now be made to the exemplary embodiments and applications of the invention. The invention, however, is not limited to these exemplary embodiments and applications or to the manner in which the exemplary embodiments and applications operate or are described herein.

Embodiments of the present invention are generally directed to techniques for physical-layer management & control within a wireless directional network. A "wireless directional network" can include a network of nodes, potentially airborne, space-borne, or land-based, or combinations thereof, that are linked by wireless data links over which computer and network traffic and data can be transmitted or conveyed from a source node to a destination node. In some embodiments, the wireless directional network can be a transit network or an inter-network "backbone" traversed by data from other networks. Therefore, the source and destination nodes for particular data flows can reside either inside or outside of the wireless directional network.

DEFINITIONS

The following definitions are explanations useful in understanding the technology comprising the wireless directional networks. The explanations are not meant to be limiting in any way.

As used herein, DANCS is an acronym for a Directional Access Network Control System used to manage, in conjunction with other network equipment, the directional wireless network.

As used herein, "network fragmentation" refers to a condition in which there is at least one pair of network nodes within the DANCS-managed network for which no clear communication path exists. Network fragmentation can provide a dynamic measure of network integrity. Except for those cases excluded by policy, each network node in an integral (un-fragmented) network has a clear communication path to each other node in the network whereby wireless communications, or data transfer can occur. This communication path can involve one or multiple "hops", or can be a direct link. In other words, network fragmentation can exist when no path is available between a first set of interconnected nodes and a second set of interconnected nodes.

As used herein, a "hop" as used in this specification, refers to a condition in which data is relayed between the data source and the destination by an intermediate network node. In theory, there is no limit to the number of hops allowed to establish a "communications path", but in practice the number is limited by various practical considerations.

As used herein, a "communications path" refers to a wireless link, or set of such links, whereby data sourced at one network node can be transmitted or conveyed to a destination network node. Generally, it is the task of a routing method or protocol used on a particular network to establish actual paths used.

As used herein, a "mutual interference condition" refers to a condition in which transmissions, or radiation emitted from one RF aperture (or antenna), is picked up by an unintended recipient at a power level and frequency sufficient to affect wireless communications at the unintended recipient. The term is similar to cross-talk in either wired or wireless systems, but a mutual interference condition herein refers specifically to wireless communications.

As used herein, "network resources" can include RF or wireless equipment, including radio transceivers, antennas (both directional and omni), frequency band synthesizers, power amplifiers, polarization angle control, and other RF equipment, that may be used in the establishment and maintenance of the wireless links that comprise a wireless network.

As used herein, "network topology" refers to the set of active data links and "order wires" or "back channels" whereby user and network control data may be transported over the network. In addition, "network topology" can include the data rates associated with these links, their frequency bands of operation, their reliability and characteristic bit error rates (BER).

As used herein, "link" refers to a wireless communication between two network resources located on different nodes. A link is generally bidirectional, although unidirectional links can also exist.

As used herein, "node position" refers to the physical location of a node, and can, for example, be specified as a time sequence of latitude, longitude and altitude coordinates.

As used herein, "node attitude" refers to the spatial orientation of a node, and can be specified as a time sequence of heading, pitch and roll values. In some formulations, in which yaw and heading are distinguished, attitude can be specified by a time sequence of heading, pitch, roll, and yaw.

As used herein "node movement" refers to movement of a node and can include translational motion, rotational motion, and combinations thereof. Node movement can, for example, be specified as motion vectors, rotational vectors, rates of change in position, rates of changes in attitude, or combinations thereof.

Adaptive Management

In some embodiments, the present invention includes the adaptive management of directional wireless networks. Adaptive management can include a set of inter-locking, or inter-operating, processes and interfaces whereby a directional wireless network can be managed. In general, both multi-access nets and directional access nets can be accommodated using directional network management techniques. Directional access refers to the use of directional antennas to form communications links between one or more of a plurality of nodes. The use of directional antennas can result in the transmission of data at higher data rates using relatively lower power as compared with omni-directional antennas. Directional antennas can also be used for increased communications security since the data is broadcast over a narrow area, making it more difficult to intercept. Generally, management of a directional network introduces complexities not present in a network formed using nodes having omni-directional antennas. For example, in a directional wireless network, two nodes which are in communications range of each other may not be in direct communications unless their antennas are pointed at each other. As another example, a node with a limited number of directional antennas may only be able to simultaneously communicate with a limited number of other nodes.

FIG. 1 illustrates an embodiment of a wireless directional network 100, wherein a plurality of platforms in the air 102, 106, 112, on land 108, 110, 114, 116, and in space 104 can each comprise a communications node. A wireless directional network can include any or all of the above-mentioned platform types, and need not include all types. A communication node can be incorporated into a vehicle, or can be placed on a battlefield or communications path as an autonomous entity, for example 116. Communications nodes can include radio communications equipment, such as for example, transmitters, receivers, antennas, and similar equipment capable of establishing wireless links 118. For example, active links can be established between a pair of nodes by communicating necessary radio communications parameters (e.g., frequency assignments, operation modes, etc.) to the nodes to enable the link to be established. Individual nodes may form multiple active links to other nodes. As the nodes present on moving air and ground vehicles can enter and leave a network area, network management & control can include methods for discovery, authentication, and authorization of nodes into a network group. To account for the large number of variables inherent in a directional wireless network, the variables can be categorized into a number of logical topical groups or management entities.

In general, management of a wireless network can include a number of aspects, including for example:
Discovery management;
Hierarchical management;
Traffic flow management;
Policy management; and
Topology management.

Discovery management can include autonomous discovery of nodes within a multi-node network. For example, nodes may enter and exit a network by communicating via pre-defined order wires using hailing and registration messages. The specific requirements for discovery, authentication and authorization can be policy driven, depending upon the type of network and the desired level of security within the network. Various known techniques for providing discovery management can be used, and thus need not be discussed further.

Hierarchal management can be used to divide a large number of nodes into a manageable number of inter-communicating groups. As the number of nodes increases, the number of possible choices for individual communications links can increase to an intractably large number. To limit the selection to a manageable number, nodes can be assigned to groups, with peer group leaders selected to manage each group of nodes. Each node within the group can be a peer group alternative, able to take over responsibilities as the peer group leader if the leader moves out of range or is destroyed. Management can be performed separately for each level of the hierarchy, with the results or outputs from management at one level being used as inputs or constraints on the next level of the hierarchy. For example, various subnets can be managed as a network, and connectivity among nodes within the subnet managed at a first level of the hierarchy. At a next level of the hierarchy, each subset can be treated somewhat like an individual node, and connectivity among the subsets managed. Nodes may be transferred from one subnet to another subnet.

Traffic flow management can be used to oversee data flow management processes across the nodes. The data flow can be managed dynamically across the network as the number of links and amount of bandwidth varies and as the nodes within the network move about. Traffic management can balance the loads across the connections and respond to the detection and prediction of link outages. Various known techniques for providing traffic flow management can be used, and thus need not be discussed further.

Policy management can provide mechanisms for communicating policy constraints to other management entities. For example, an unmanned aerial reconnaissance vehicle may use a dedicated broadband data link between the vehicle and a ground commander to provide reconnaissance information for an advancing group. Policy management can instruct the various management entities that the link has a high priority and should be sustained at the cost of lower priority links. If the overall network becomes bandwidth limited, the reconnaissance link may be given a priority while other lesser-needed links can be limited in bandwidth or shut down if necessary. Policy can also include negative constraints, such as disallowed connections (e.g., node A is not to ever be directly linked to node B). Policies may include quality of service requirements for specific data flows, transmission security requirements for specified links or platforms, communications security requirements for specified data flows, frequency plans and bandwidth constraints, and the like. Policy management can provide constraints on the topology management as will become more apparent from examples of the topology management described below.

Topology management can be used for overall spectrum management and can determine, establish, and maintain a mesh (partial or full) of radio frequency links between the various nodes. For example, possible solutions can be limited according to the physical capabilities of each node. Some nodes can have higher power or more bandwidth capabilities than other nodes. Topology management can monitor each node for performance of predetermined criteria of the links, such as the bit error rate, signal to noise ratio, or similar measures. Topology management can attempt to optimize network performance by adjusting the mesh of nodes by adding, deleting, or reconfiguring links. Topology management can also include monitoring and predicting outage occurrences and duration of outages due to obstructions caused by a platform or geography. The topology manager can make pre-emptive changes to the network topology in order to avoid the loss of network services due to predictable link outages. The various data links throughout the mesh of nodes can also be reinforced to avoid loss of network services due to unpredictable link outages. This can include the creation and maintenance of redundant paths to increase network reliability.

When a network node joins a managed network, the joining node can communicate its characteristics to the managing entities. A database of all of the radio frequency (RF) equipment within the network can thus be compiled. The database can be subjected to the management decisions of the managing entities. The RF equipment (RFE) can include all of the receivers, transmitters, repeaters, and other equipment used in forming the directional network. The RFE can be registered with the managing entities, along with associated characteristics, and used by the managing entities in making management decisions.

Network topology can include the set of all currently active links, amplifier levels, frequency band-of-operation assignments, data rates, modulation types, etc., which determine the ability of a wireless network to transport data. Network topology management entities can include a topology manager and a topology optimizer. The inter-relationships of these two entities are described in the following sections.

The network topology management entities can include interfaces whereby input can be received from a policy management entity, a data flow management entity, and a hierarchical network management entity. However, the network topology management entity need not rely upon these external agents and can be capable of managing the network topology both in the absence of and in the presence of any of policy requirements, data-flow requirements, and hierarchical layering. When policy management, data flow management, hierarchal management, or other control schemes are included, they can operate as constraints on the decisions made by the network topology management entities. When other management entities are not available, the topology management entities can be left to make unconstrained decisions.

Network topology management can comprise a network topology manager entity. This entity can be responsible for the coordination and dissemination of network topology changes to the network (e.g., tearing down one link, and setting up another), and for collecting status for active links and for network nodes, as well as router status, if available. The network topology manager is also responsible for deciding upon appropriate network topologies based upon the imposed constraints and circumstances and available resources. Because wireless links—especially for military applications—tend to be dynamic to one degree or another, the topology manager can be configured to be adaptive. It can react to unanticipated changes to individual nodes, or links, etc. It can also be used to anticipate potential losses or outages and take preventive or proactive measures.

There are many processes and criteria that can be utilized by the network topology manager for the purpose of optimizing, or adjusting the network topology. For this reason, the topology manager can be structured so it can invoke a variety of different processes based on the requirements of the network or mission. In some embodiments, the network topology manager can include an anti-fragmentation process. This process, along with its inter-relationships with the network topology manager, is described below.

Overview of the Anti-Fragmentation Process

The anti-fragmentation process attempts to optimize the network topology in the sense that it attempts to minimize network fragmentation. If no communications path exists between two nodes in a DANCS-managed network for some period of time, the network is said to be fragmented. The anti-fragmentation process is responsible for managing network resources in such a way as to minimize the percentage of time the network is fragmented. Because of the dynamic nature of DANCS-managed networks, a solution found by the anti-fragmentation process may be effective for a limited period of time. Situational dynamics can include nodes that join and/or leave the network, nodes that move out-of- or into-range of other nodes, existing links that may become jammed by friendly or unfriendly sources, nodes or links lost due to the interposition of terrain, and platform/wing shadowing of an antenna, etc. The anti-fragmentation process can update the network topology to account for these situational dynamics.

Moreover, in order to more effectively minimize network fragmentation, the anti-fragmentation process can anticipate changes to the network before they occur, to the extent possible. In practice, there are both predictable and unpredictable outages that occur. It can, for example, be predicted in advance that a certain node will soon be out-of-range of another network node to which it is presently linked by a wireless data link. For example, a link budget can be calculated based on current or future positions of the nodes operating in the link, the operating rate (e.g. data rate or symboling rate) of the link, and RFE characteristics (e.g., transmit power, receive figure of merit, etc.) It can also be predictable that a certain pair of nodes will pass on opposite sides of a mountain, or other obstruction, or that a particular platform (e.g., a UAV) will bank in a turn, causing an outage due to wing-shadowing. Also, a particular node may give notice that it will be leaving the network within a certain time-interval. All of these conditions are predictable to a degree, and, by taking proactive measures, the anti-fragmentation process can be able to prevent network fragmentation from occurring.

Events that are not predictable include (but are not limited to) the loss of an aircraft due to hostile actions (attrition), or a sudden evasive maneuver which results in an outage due to platform-shadowing. The anti-fragmentation process can respond reactively to such events, restructuring the network topology in such a way as to heal any network fracturing that may occur as a result of unanticipated outages or attrition. Moreover, the anti-fragmentation process proactively examines and analyzes the network topology for potential weaknesses (e.g., single points of failure, such as a link which, if lost, would fragment the network). When weaknesses are identified, these weaknesses can be reinforced to the extent allowed by available network resources.

The anti-fragmentation process therefore can provide a network with a self-healing, self-adapting, proactive and reactive mechanism for managing network resources. This management process can be invoked periodically in order to update the network topology in accordance with the dynamics of the network. The rate at which it is invoked can be dependent on the dynamics of the network being managed. In general, the time interval can correspond to the largest duration at which the network state remains highly correlated with the previous state. This interval of time is referred to herein as the "time horizon".

The anti-fragmentation process can be invoked by the "topology manager", which coordinates the communications with other nodes. These communications include collecting status updates from all network nodes, and coordinating network topology changes as required.

The network topology manager can operate in either a centralized mode (in which a single network node—the Peer Group Leader (PGL)—is responsible for managing the network topology), or a distributed mode (in which each network node performs the same set of calculations, and coordinates network changes with other affected network members independently). In either case, the topology optimization process (the anti-fragmentation process) remains the same. For simplicity, then, but without loss of generality, a centrally-managed network will be described.

Communications between the various nodes necessary to establish a network can be accomplished in a number of ways. One method involves the use of a back channel, or "order wire." This can be, for example, an already established network connection based on a legacy waveform. Alternatively, the communications can take place over the data channels (when these have been established), or over a low-rate hailing channel when a particular node has become otherwise unrecoverably isolated from, or fragmented from, the network. The details of this communication are not essential, and thus will not be described further.

Topology Management

The topology manager (located on the PGL for a centrally-managed network) can be described and implemented as a state machine in which transitions occur based on status arrival from other nodes, and upon a regularly-scheduled topology update transition. Upon transitioning to the network topology update state, the topology management process can perform the sequence of operations illustrated in flow chart form in FIGS. 2A and 2B as described below.

Figure 2A:
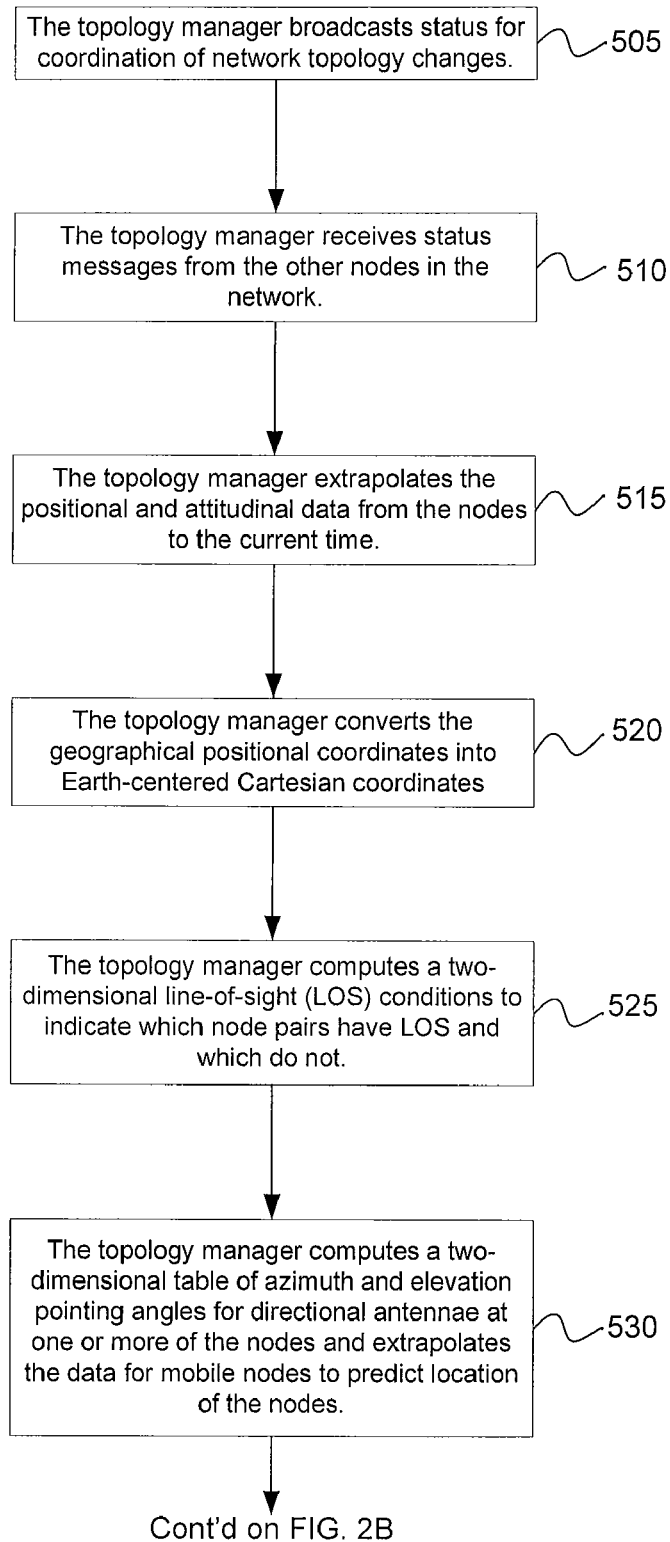
FIG. 2A and FIG. 2B are a flow chart of a topology management process in accordance with some embodiments of the invention.
Figure 2B:
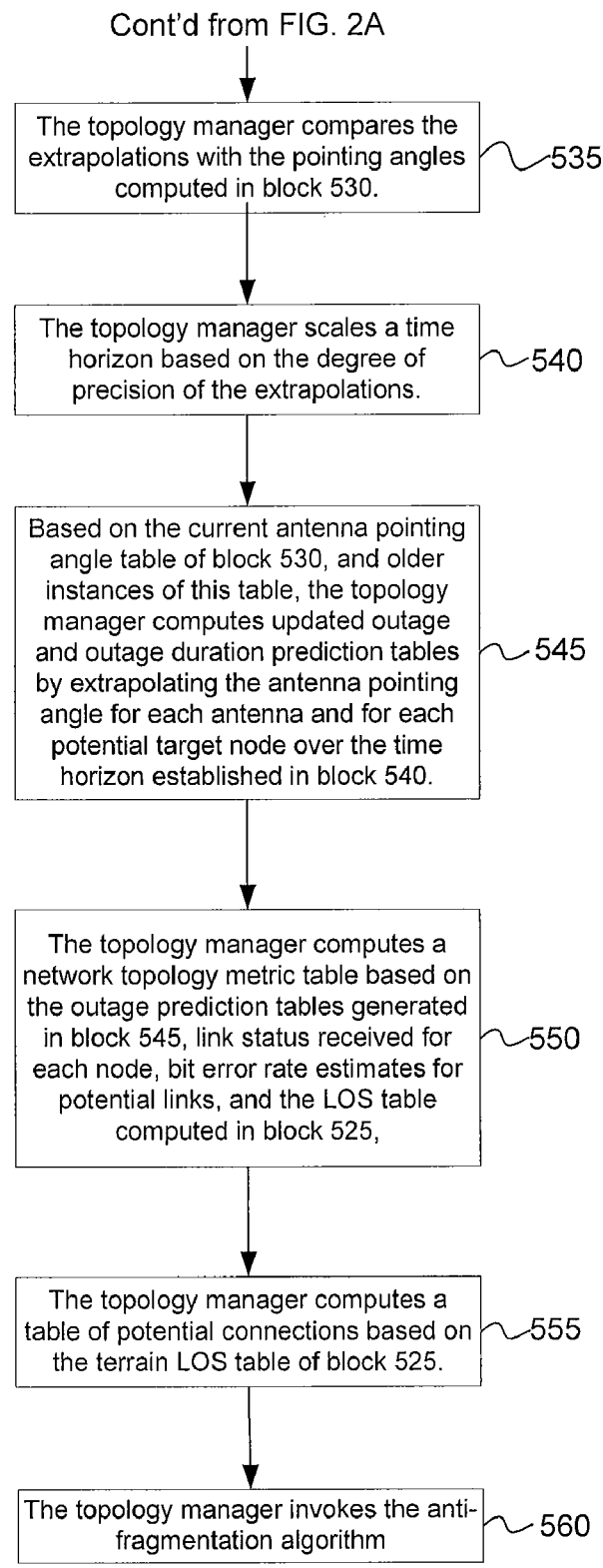

The topology manager can broadcast its own status (including position, attitude and link statuses) for the coordination of network topology changes, as shown in block 505 of FIG. 2A and can receive status messages from the other nodes as shown in block 510. The status messages can include positional and attitudinal data from the nodes as well as link performance data.

The topology manager can convert the geographical positional coordinates into Earth-centered Cartesian coordinates, as shown in block 520 in FIG. 2A. This computation can utilize an Earth model such as the WGS84 Earth model (or other models), to establish the "reference ellipsoid". The computation can be enhanced by "geoid" data for greater precision. This conversion facilitates the vector computations made by the anti-fragmentation network topology optimization process, and are made available to the same. These computations can be based on an Earth model. For example, the WGS84 reference ellipsoid is a simple model, but this Earth model can also be refined by a DTED database of the local terrain (which references local mean sea level), corrected by a geoid database, which references the terrain data to the reference ellipsoid. The choice of particular Earth model used for this set of computations does not change the basic operational process, but can affect the accuracy and effectiveness. If, for example, accurate terrain data is not available, the anti-fragmentation process can continue to function, but may not be able to predict outages due to terrain blockage, and may be limited to reacting to blockages which occur. On the other hand, even without terrain data, some prediction of outage can be made based on range limitations and platform shadowing profiles of the communications equipment on the nodes.

Figure 3:
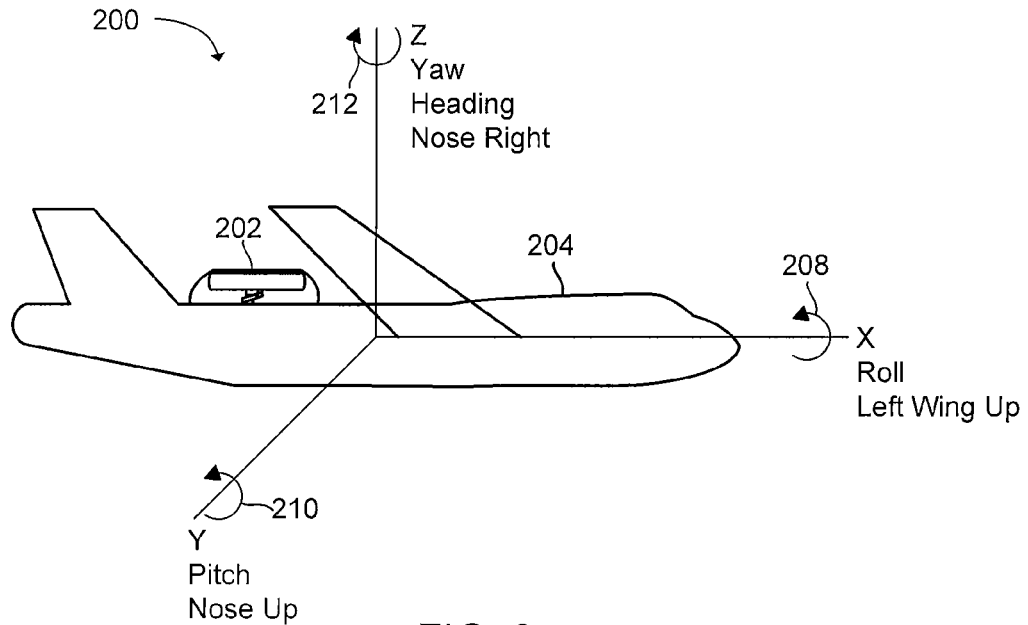
FIG. 3 is an illustration of a node in accordance with some embodiments of the invention.

The topology manager, having collected status messages from the other nodes since the last update transition, as shown in block 510, can extrapolate the positional and attitudinal data from these nodes to the current time, as shown in block 515. For example, a node 200, as shown in FIG. 3, can comprise an aircraft 204 having an antenna 202 that can be used to transmit and receive RF signals to other nodes in the network. The aircraft can transmit its positional and attitudinal status to the topology manager at the peer group leader. In some embodiments, the positional and attitudinal status can include the latitude, longitude, altitude, heading 212, pitch 210, and roll 208. The positional and attitudinal status can change rapidly with time, and the status updates from different nodes arrive at different times. By extrapolating the position of each node, the approximate location of the node can be determined between status updates. Similarly, by extrapolating attitude of each node, attitude of the node can be estimated between status updates. In addition, if a status update is missed, the extrapolation can be made with available data. However, the extrapolated data may become less accurate with older data which "ages" quickly.

Based on these extrapolated Cartesian coordinates, and on a model of the local terrain, the topology manager can compute a two-dimensional terrain blockage table of node-pair LOS conditions. This table is utilized by the anti-fragmentation process to filter possible topologies, as described in more detail below.

Figure 4:
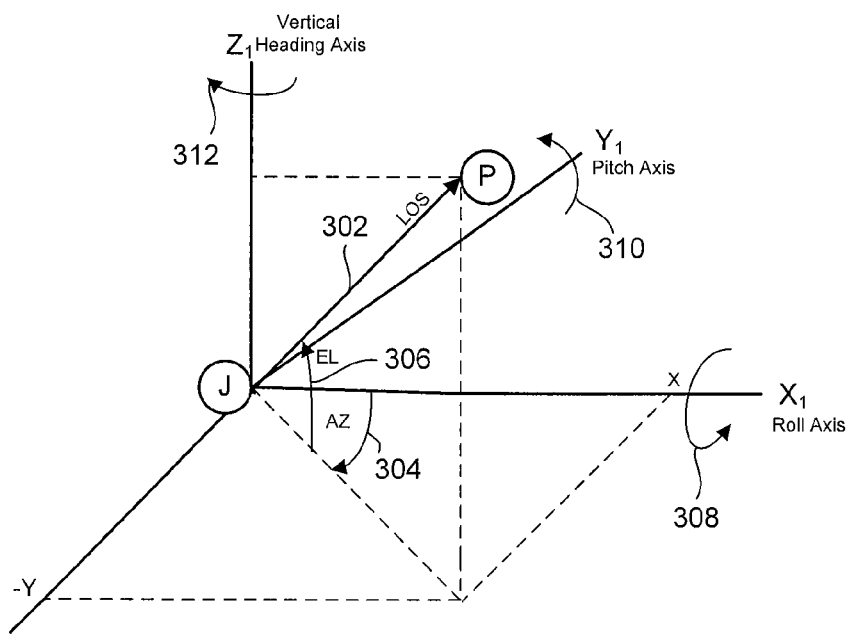
FIG. 4 is a diagram showing line-of-sight and azimuth and elevation angles in accordance with some embodiments of the invention.

Furthermore, based on the extrapolated positional estimates of the nodes, and attitudinal estimates of the node on which a given directional antenna is mounted, the azimuth 304 and elevation 306 of each directional antenna mounted on node J, when pointing at node P, can be determined. For example, FIG. 4 shows the LOS 302 measurement from a particular antenna mounted on node J to a node P. The roll 308, pitch 310, and vertical heading (plus yaw) 312 axes, which define the attitudinal coordinates, are shown. By comparison of these pointing angle estimates with the platform shadowing characteristic profile associated with each directional antenna, a three-dimensional table can be formed that indicates which directional antenna to destination node pairs are unshadowed by the antenna-bearing platform, and which are not. For a given antenna pair, where each antenna is located on a separate and distinct node, the said three-dimensional table can be utilized to determine if both sides of the potential link are free and clear of platform shadowing. By utilizing this three-dimensional platform-shadowing table together with the two-dimensional terrain-shadowing table, and a table of range limitations for each potential link, the anti-fragmentation process is thereby able to filter possible topologies according to whether or not potential links are viable. As described above, based on the extrapolated positions and attitudes of each node in the DANCS-managed network, the topology manager can compute two-dimensional tables of azimuthal and elevational pointing angles for directional antennas, which can contain the antenna pointing angles for every possible node pair within the managed group of nodes, as shown in block 530 of FIG. 2A. Azimuth 304 and elevation 306 angles are shown in FIG. 4 and determine the settings for each directional DANCS-managed antenna in the network required to point that antenna at each other node in the network. These values are utilized by the anti-fragmentation process to determine whether or not, based on platform/wing shadowing models for each antenna, an antenna can "see" another node at the present time. Moreover, using past estimates of antenna pointing angles, the anti-fragmentation process can extrapolate the data in order to make a prediction of outages due to platform/wing shadowing, and outage durations. These computations can be used by the anti-fragmentation process to filter potential network topologies, and to take proactive measures if an outage on an important data link has been forecast. While azimuth and elevation angles are typically used, other coordinate systems can also be used.

The time interval over which the topology manager performs updates can be varied dynamically based on how rapidly the nodes change position (in either an absolute or relative sense). For example, based on past extrapolations of the antenna pointing angles, the topology manager can compare those extrapolations with the pointing angles previously computed as shown in block 535 of FIG. 2B. This comparison can be performed for the purpose of monitoring the stability of the extrapolation process, and adjusting the "time window" or "time horizon" over which the extrapolation occurs. If the comparison reveals a significant discrepancy, then it can be assumed that the extrapolation process is unable to forecast antenna pointing angles with sufficient accuracy to provide a basis for making stable network topology decisions. In this event, the "time horizon" can be scaled back by an increment. If, on the other hand, the comparison reveals a very high degree of precision in the extrapolation procedure, then the "time horizon" can be scaled or incremented upwards. The size of the increment can be on the order of one second, but this is not an essential characteristic of the process. The time increment can be selected to choose a desired compromise between adaptation speed and stability, with larger time increments providing faster adaptation but increased risk of instability. By thus adjusting the extrapolation/prediction processes, as shown in block 540, a stable and accurate basis can be provided to the anti-fragmentation process for making network topology decisions.

Based on the current antenna pointing angle tables (computed in block 530), and older instances of this table computed on prior transitions to the topology update state, the topology manager computes updated outage and outage duration prediction tables, as shown in block 545. These tables can be computed by an extrapolation of the antenna pointing angle for each antenna and for each potential target node over the "time horizon" established in block 540. These outage prediction tables are used to provide, in part, the basis for making network topology decisions.

The network topology manager then computes a "network topology metric" table, as shown in block 550. The network topology metric table can be based on the outage prediction tables generated in block 545, link status received for each node, BER estimates (or similar measures) for potential links for which no status exists, and the LOS table computed in block 525. In addition, the metric table entry for each link (whether actual or potential) can depend on the actual or estimated link rate for that link. This metric table can provide the primary basis on which the anti-fragmentation process makes network topology decisions. If, for example, a link is presently occluded by terrain, and the prediction processes forecast that it will remain occluded over the "time horizon" established in block 540, the metric of this link can be set to zero and eliminated from potential network topologies. This method demonstrates how the anti-fragmentation process can filter candidate topologies based on tables of current and predicted platform shadowing and/or terrain blockage conditions, and estimates of blockage durations. If a high rate link is presently operational and having acceptable performance (e.g., low BER and high reliability), the metric can be set to a high value. It is also to be noted that these metrics can be weighted according to the needs of the system, which are established by policy requirements, and link utilization levels. For example, if a link would otherwise have a very high metric value, but provides a path over which very little traffic is flowing, the metric can be weighted accordingly, and the link can be eliminated if the associated network resources are better utilized in some other capacity (i.e., in forming other links with more potential value to the network). Note also that, if a link were chosen to be established, it can require some time in which to sync up. The topology manager can treat this sync up time as an outage of known duration, and, by taking this sync time into account, thus help to effectively maintain the continuity of the network.

The topology manager computes a table of potential connections based on the terrain LOS table (from block 525) and platform/wing-shadowing LOS table (based on the table computed in block 530 and the databases of platform/wing-shadowing models), as shown in block 555, and as described previously. This potential connections table is a convenience for the topology optimization computations performed by the anti-fragmentation process, and can be used to reduce computational complexity, and other implementations can be used as well. It provides a convenient mechanism whereby the anti-fragmentation process is aided in filtering candidate topologies, without repeatedly computing link viability conditions.

The topology manager invokes the anti-fragmentation process, as shown in block 560, which utilizes the tables previously computed in order to optimize or make adjustments to, the network topology. The anti-fragmentation process is described in further detail below.

The topology manager can be notified by the anti-fragmentation process when the network topology computations are complete. This notification can be an interrupt, or similar procedure or common method, and the details need not be described further. If topology changes have been decided upon by the anti-fragmentation process, then these changes can be communicated to the network. For example, network configuration information can be communicated via an order-wire, back channel, or over data channels, depending on the procedures established for the system. Moreover, the topology manager can coordinate these changes by a sequence of acknowledgements from the affected nodes that the required changes have been implemented, and by status messages indicating the status of the link(s).

The topology manager, following completion of the process, can return to an idle state, until a status update, acknowledgement, or other transition occurs. The topology manager can schedule a new update transition for a future time, the timing of which can depend on the dynamics of the system. For example, updates can be scheduled for a fraction of the "time horizon" (e.g., 0.2 of the time horizon).

Figure 5A:
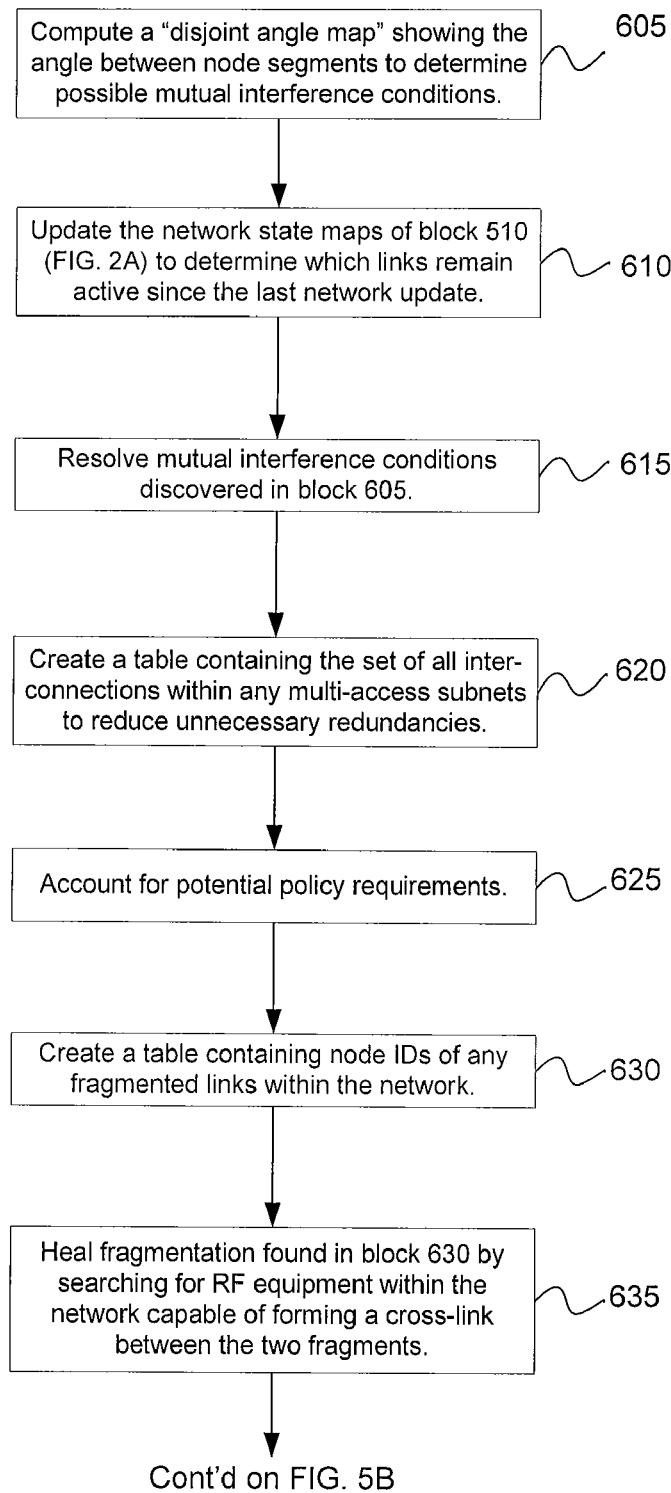
FIGS. 5A and 5B are a flow chart of an anti-fragmentation process in accordance with some embodiments of the invention.

Anti-Fragmentation Process:

Turning to the anti-fragmentation process, additional detail of one embodiment of an anti-fragmentation process is illustrated in the flow chart of FIG. 5A.

Figure 6:
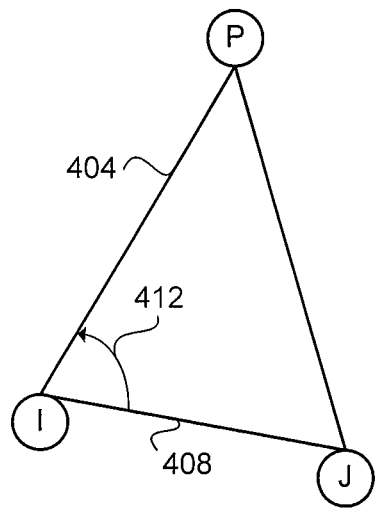
FIG. 6 is a diagram showing an exemplary disjoint angle table in accordance with some embodiments of the invention.

The anti-fragmentation process can include computing a "disjoint angle table" of the nodes. In some embodiments, the disjoint angle table can comprise data showing the angles between each pair of line segments joining node pairs within the managed group of nodes. For example, as shown in FIG. 6, this map can contain the angle between the line segment 408 joining nodes i & j, and the line segment 404 joining nodes i & p, where i, j, & p are network node indices ranging between 0 and (N−1), and where i≠j, i≠p and j≠p. N represents the number of network nodes in the DANCS-managed network. The table can also contain the angles between completely disjoint node pairs, such as between the line segment joining nodes i & j, and the line segment joining nodes p & q, where all of these node indices differ. The computation of this table can be facilitated by the tables of Cartesian coordinates computed above in block 605 of FIG. 2A. The "disjoint angle table" helps to provide a basis for determining when mutual interference conditions arise between both actual and potential links involving nodes moving with respect to one another. Using the disjoint angle table, along with knowledge of each transmitter, such as the beam width, beam power, etc., it can be determined whether the radiation emitted by a transmitter might be received by an unintended receiver in sufficient intensity to result in mutual interference. If mutual interference is likely to occur between two active links, the operating frequency band and/or link rate of one or more of the transmitters can be changed.

Using the mutual interference table computed previously, all currently active links, including links that are presently being brought up, can be examined for mutual interference conditions that can be resolved, as shown in block 615. If a mutual interference condition is found, a number of strategies can be employed to resolve the interference. Firstly, one or the other frequency bands-of-operation of the interfering links can be changed, thereby resolving the condition, if the associated RFE possesses the necessary flexibility. The characteristics of each piece of RF equipment can be registered in tables when a node first joins the network. By looking up the frequency band-of-operation parameters for the affected links in these tables, it can be determined whether the interference condition can be resolved by this means. Secondly, if the interference condition cannot be resolved by changing the frequency band-of-operation of one or the other link, then the bandwidth or data rate of one or both affected links can be adjusted. The flexibility in doing this can also be registered in tables characterizing each piece of RFE. If the data rate is changed, then the network topology metric associated with the link can be updated to reflect this change. If a frequency band-of-operation is changed, it can create mutual interference conditions with other links with which it previously had none. Therefore, iteration can be performed until a stable solution is found. If no solution can be found whereby both interfering active links can be maintained, one of the links can be eliminated, based on the associated topology metrics.

Together with LOS, platform shadowing and range limitations, the identification of unresolvable potential mutual interference conditions can be utilized by the anti-fragmentation process to modify the afore-mentioned network metric table. This multi-dimensional table can be examined by the anti-fragmentation process whenever a potential link is considered in order to evaluate that link within the network topology.

The optimization process can also include updating the "network state maps", as shown in block 610. These maps can indicate which links remain active since the last network update. This procedure is based upon status collected by the topology manager, and entered into tables for reference by the topology optimization process as described above. Link status in the form of bit error rate (BER) can also be compiled into a table by the PGL. These link status tables not only affect the corresponding network metric values, but can be used to calibrate the algorithms that estimate maximum link range for active links.

If there are multi-access subnets embedded within the DANCS-managed network, the set of all inter-connections within this subnet can be entered into a table, as shown in block 620, so that the DANCS (anti-fragmentation) network optimization process doesn't create unnecessary redundancies, thereby freeing up RFE for more critical needs. In some cases, there may not be any embedded multi-access subnets, and the anti-fragmentation process need not rely upon the presence thereof. If embedded subnets are present, their presence merely acts as a constraint on the solutions generated by the anti-fragmentation process. Subnets may also be dealt with as part of a hierarchical management process, as mentioned above.

In block 625, policy requirements are accounted for. In particular, if policy requires a link be established between a given pair of network nodes, the anti-fragmentation process checks to assure that the link has been, or is being, established. If this is not the case, then an iterative process can be invoked to establish this link. This process, possessing tables of all available and in service RF equipment in the DANCS-managed network, searches through the tables for equipment that can be brought into service, and establishes the required links. If multiple choices exist, the process can discriminate between these by comparing the network topology metric for each potential link and choosing the highest valued link. If the same equipment is required to satisfy multiple policy requirements, a decision can be made based on the best network topology metric. If policy constraints haven't been met by these strategies, the process can search through its tables of "in service" equipment to find a non-essential link that can be torn down to satisfy the outstanding policy requirement via the freed up equipment.

The process can also include determining network fragmentation, as shown in block 630. This determination can be based not only on currently active links, but also on links that are being brought up (since it would be unnecessary to establish a link where one is already in the process of being established). If fragmentation is detected, the groups of node IDs in each fragment can be collected together in lists.

Block 636 addresses healing the fragmentation. If a fragmentation condition exists, the process first attempts to heal the fragmentation. Healing can be performed using operations similar to that described for block 625. The process can search through its lists of available RFE in an attempt to find equipment that can be put into service that would form a "cross-link" between two fragments. If multiple choices exist, the choices can be discriminated between by comparing the associated network topology metrics. If no cross-link can be established, the process can search through lists of "in service" equipment to determine if a non-essential link can be torn down, and the equipment used to heal the fragmentation. This determination of "non-essentiality" can be made based not only on network topology metric, but also on whether or not tearing down the link would itself create a fragmentation. If there are multiple non-essential links available, they can be evaluated based on existing network topology metric, their value in resolving the fragmentation, and value to the network once established.

Figure 5B:
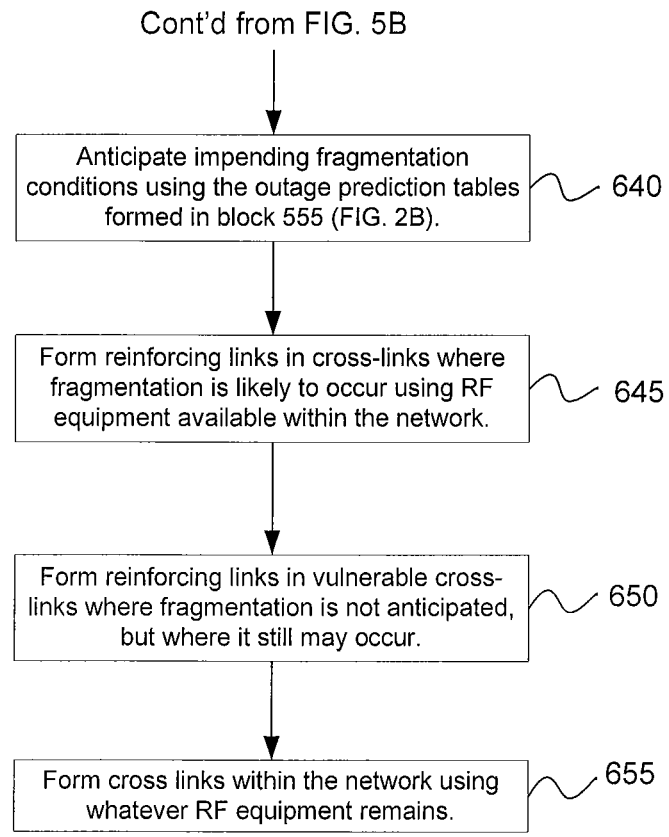

If no fragmentation condition currently exists, the process attempts to predict impending fragmentation conditions, as shown in block 640 on FIG. 5B. This can be done by listing links that, if lost, would result in network fragmentation. Active links (both clear and coming up) can be eliminated one at a time from the topology map and the resulting topology evaluated for fragmentation. For those cases in which breaking the link results in fragmentation, the process can look up the corresponding entry in the Outage Prediction table. If an outage has been predicted, the process can take proactive measures as shown in block 645. At this point, the process can perform similar operations as for block 635 for building a cross-link between two fragments. By doing this, when (and if) an outage does occur on the vulnerable link, a reinforcing link will already be up, or in the process of coming up, and the network fragmentation thereby minimized.

There may be links which, if broken, would result in a fragmentation of the network, but which are not predicted to break. Nevertheless, there are unpredictable factors at work in dynamic wireless networks that may cause an unforeseeable outage of the vulnerable link. For this reason, the anti-fragmentation process attempts to reinforce these vulnerable links in the same manner as shown in block 650. Note that by putting block 645 ahead of block 650, the vulnerable links for which an outage is predicted are considered first, and are thus given priority. The remaining vulnerable links, reinforced in block 650, can be reinforced with RF equipment not utilized in block 645 and with the same constraints as in block 645.

Finally, the process can include attempting to build cross-links within the network using whatever RFE remains and is available, as shown in block 655. This can be constrained so that it doesn't break existing links, even if they might be non-essential. And it can be constrained so that it doesn't interfere with RFE used to resolve network fragmentations in previous blocks. In other words, the process can consider only available RFE. If there are multiple choices that can be made with existing RFE, the anti-fragmentation process can discriminate amongst these by the network topology metric, choosing the link with the highest metric value.

Upon completion, the anti-fragmentation process can make the results of network topology decisions available to the topology manager. This can be accomplished by various means, including for example, placing the network topology decisions into a shared memory area.

CONCLUSION

Figure 7:
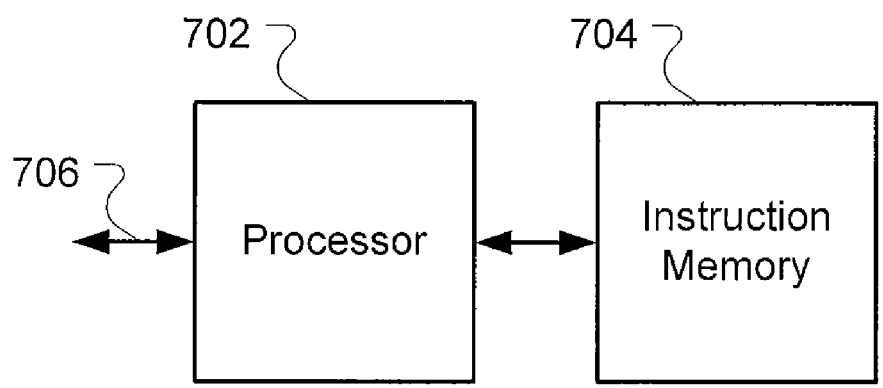
FIG. 7 is a block diagram of a general purpose processor having memory holding computer-executable instructions for implementing a process in accordance with some embodiments of the invention.

The various processes described herein can, for example, be implemented using software executing on a general purpose or specialized processor, such as a microprocessor, reduced instruction set computer, or the like. For example, FIG. 7 illustrates a processor 702 having an instruction memory 704 coupled thereto. The instruction memory can hold computer-executable instructions (e.g., object code) and can be implemented using various techniques known in the art, including for example, read only memory, random access memory, magnetic memory, ferroelectric memory, optical memory, and the like. The instruction memory can be separate from the processor, or can be integrated with the processor in a common package, integrated circuit, etc. The processor can include input/output interfaces 706 by which the processor can be interconnected to other equipment. For example, input signals can be representative of node location and position of nodes within the network, and output signals can be representative of commands or configuration information to be provided to communications equipment on the nodes.

As another example, the various processes can be implemented within digital hardware, including for example, using state machine techniques implemented within discrete logic, field programmable gate arrays, custom integrated circuits, and the like.

Summarizing and reiterating to some extent, a directional wireless network can be managed using techniques as described herein. Real-time autonomous management of physical layer communications links within the network can be set up, torn down, and reconfigured in response to predicted and actual outage and fragmentation conditions. Fragmentation of the network can be predicted, and communications equipment reconfigured to heal fragmentation. Mutual interference conditions can occur as nodes move relative to each other, and mutual interference taken into account and avoided as a part of the network management. Preemptive changes can be made to the network topology to minimize or avoid nodes becoming unreachable.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, there is no intention that the invention be limited to these exemplary embodiments and applications or to the manner in which the exemplary embodiments and applications operate or are described herein. For example, features shown in one embodiment can be combined with features shown in another embodiment. Accordingly, it is not intended that the invention be limited, except as by the claims set forth below.

The invention claimed is:

1. A method for managing physical connectivity in a wireless directional network wherein the wireless directional network comprises a plurality of nodes each having radio communications equipment, and wherein one or more of the nodes is actively moving in three dimensions, the method comprising:
   linking two or more of the plurality of nodes together using the radio communications equipment to form a plurality of linked nodes having active links;
   determining positions and motion of each of the plurality of nodes;
   predicting outages for the active links using the positions and motion of each of the plurality of nodes;
   determining if the predicted outages will result in network fragmentation wherein there is no communications path between any node in a first set of the nodes and any node in a second set of the nodes; and
   if the predicted outages will result in network fragmentation, before the predicted outages occur:
      identifying first communications equipment in a first node in the first set of nodes having line of sight connectivity but not actively linked to second communications equipment in a second node in the second set of nodes based on the positions and motion; and
      establishing a direct active link between the first communications equipment in the first node and the second communications equipment in the second node.

2. The method of claim 1, wherein the linking comprises forming a plurality of directional point to point links.

3. The method of claim 1, wherein the linking comprises assigning radio frequency allocations to the radio communications equipment to avoid mutual interference.

4. The method of claim 1, wherein the determining positions comprises predicting a future position of each node based on the motion of each node.

5. The method of claim 1, wherein the determining positions comprises determining an attitude of each node.

6. The method of claim 5, wherein the determining positions comprises predicting a future attitude of each node.

7. The method of claim 1, wherein the identifying comprises selecting antennas on each of the identified nodes having clear view to each other along the line of sight.

8. The method of claim 1 wherein the predicting outages comprises:
   predicting future positions and attitudes of each node having an active link; and
   determining if line of sight connectivity will be lost on an active link based on the future positions and attitudes.

9. The method of claim 1, wherein the predicting outages comprises accounting for terrain in the vicinity of the nodes having an active link.

10. The method of claim 1, wherein the predicting outages comprises:
    computing pointing angles for antennas on each node having an active link based on the positions and attitudes; and
    predicting mutual interference conditions based on the pointing angles.

11. The method of claim 10, wherein predicting mutual interference conditions comprises computing disjoint angles for each pair of nodes having an active link therebetween.

12. The method of claim 1, wherein the predicting outages comprises accounting for nodes having an active link that are scheduled to leave the network.

13. The method of claim 1, wherein the predicting outages comprises measuring performance of the active links.

14. The method of claim 1, wherein the predicting outages comprises computing link budgets for each active link based on the future positions, operating rates of each active link, and corresponding radio frequency equipment characteristics.

15. The method of claim 1, wherein the identifying comprises accounting for nodes scheduled to enter the network.

16. The method of claim 1 wherein the establishing an active link comprises communicating equipment assignments to the identified nodes.

17. The method of claim 1 further comprising:
    discovering vulnerable active links for which the loss thereof will result in network fragmentation;
    searching for nodes having available radio frequency equipment that can reinforce the vulnerable active links; and
    assigning the available radio frequency equipment to form additional active links.

18. The method of claim 1 wherein the predicting, the determining, the identifying, and the establishing are repeated after an interval.

19. The method of claim 18 wherein the interval is dynamically varied based on the rate of change of the positions of the plurality of nodes.

20. The method of claim 1, wherein:
the first set of nodes comprises a plurality of the nodes, and the second set of nodes comprises a plurality of the nodes.

21. A method for managing physical connectivity in a wireless directional network wherein the wireless directional network comprises a plurality of nodes each having radio communications equipment, and wherein one or more of the nodes is actively moving in three dimensions, the method comprising:
   linking two or more of the plurality of nodes together using the radio communications equipment to form a plurality of linked nodes having active links;
   determining positions and motion of each of the plurality of nodes;
   predicting outages for the active links using the positions and motion of each of the plurality of nodes;
   determining if the predicted outages will result in network fragmentation wherein there is no communications path between any node in a first set of the nodes and any node in a second set of the nodes;
   identifying first communications equipment in a first node in the first set of nodes having line of sight connectivity but not actively linked to second communications equipment in a second node in the second set of nodes based on the positions and motion; and
   establishing a direct active link between the first communications equipment in the first node and the second communications equipment in the second node,
   wherein the predicting outages comprises:
      computing pointing angles for antennas on each node having an active link based on the positions and attitudes of the linked nodes; and
      determining platform shadowing based on the pointing angles.

22. A wireless directional network comprising:
   a plurality of nodes each comprising radio frequency communications equipment, wherein at least one of the plurality of nodes is mobile and the radio frequency communications equipment is capable of establishing directional communications links;
   a topology manager disposed on at least one of the plurality of nodes, the topology manager comprising:
   means for receiving information describing a position and motion of each of the plurality of nodes;
   means for receiving information describing the link state and link health for each one of the active links;
   means for predicting outages for the active links using the positions and motions of each of the plurality of nodes;
   means for determining if predicted outages will result in network fragmentation wherein there is no communications path between any node in a first set of the nodes and any node in a second set of the nodes; and
   means for, if the predicted outages will result in network fragmentation, before the predicted outages occur:
      identifying first communications equipment on a first node in the first set of nodes having line of sight connectivity but not actively linked to second communications equipment in a second node in the second set of nodes based on the positions; and
      establishing a direct active link between the first communications equipment in the first node and the second communications equipment in the second node.

23. The network of claim 22, further comprising a plurality of topology managers, each topology manager disposed on a corresponding one of the plurality of nodes.

24. The network of claim 23, wherein each topology manager is configured to manage a hierarchically defined subset of the plurality of nodes.

25. The network of claim 22, wherein the topology manager further comprises:
   means for receiving information describing an attitude of each of the plurality of nodes; and
   means for receiving information describing the motion of each of the plurality of nodes.

26. The network of claim 22, wherein:
the first set of nodes comprises a plurality of the nodes, and the second set of nodes comprises a plurality of the nodes.

27. A wireless directional network comprising:
   a plurality of nodes each comprising radio frequency communications equipment, wherein at least one of the plurality of nodes is mobile and the radio frequency communications equipment is capable of establishing directional communications links;
   a topology manager disposed on at least one of the plurality of nodes, the topology manager comprising:
   means for receiving information describing a position and motion of each of the plurality of nodes;
   means for receiving information describing the link state and link health for each one of the active links;
   means for predicting outages for the active links using the positions and motions of each of the plurality of nodes;
   means for determining if predicted outages will result in network fragmentation wherein there is no communications path between any node in a first set of the nodes and any node in a second set of the nodes;
   means for identifying first communications equipment on a first node in the first set of nodes having line of sight connectivity but not actively linked to second communications equipment in a second node in the second set of nodes based on the positions; and
   means for establishing a direct active link between the first communications equipment in the first node and the second communications equipment in the second node;
   wherein the topology manager further comprises:
      means for receiving information describing an attitude of each of the plurality of nodes; and
      means for receiving information describing the motion of each of the plurality of nodes;
   wherein the topology manager further comprises:
      means for predicting a predicted position and a predicted attitude of each of the plurality of nodes at a future point in time; and
      means for predicting future network fragmentation wherein there is no communications path between any node in a third set of nodes and any node in a fourth set of nodes;
      means for identifying third communications equipment in a third node in the third set of nodes having line of sight connectivity to fourth communications equipment in a fourth node in the fourth set of nodes based on the positions; and
      means for establishing a direct active link between the third communications equipment in the third node and the fourth communications equipment in the fourth node.

* * * * *